UNITED STATES PATENT OFFICE.

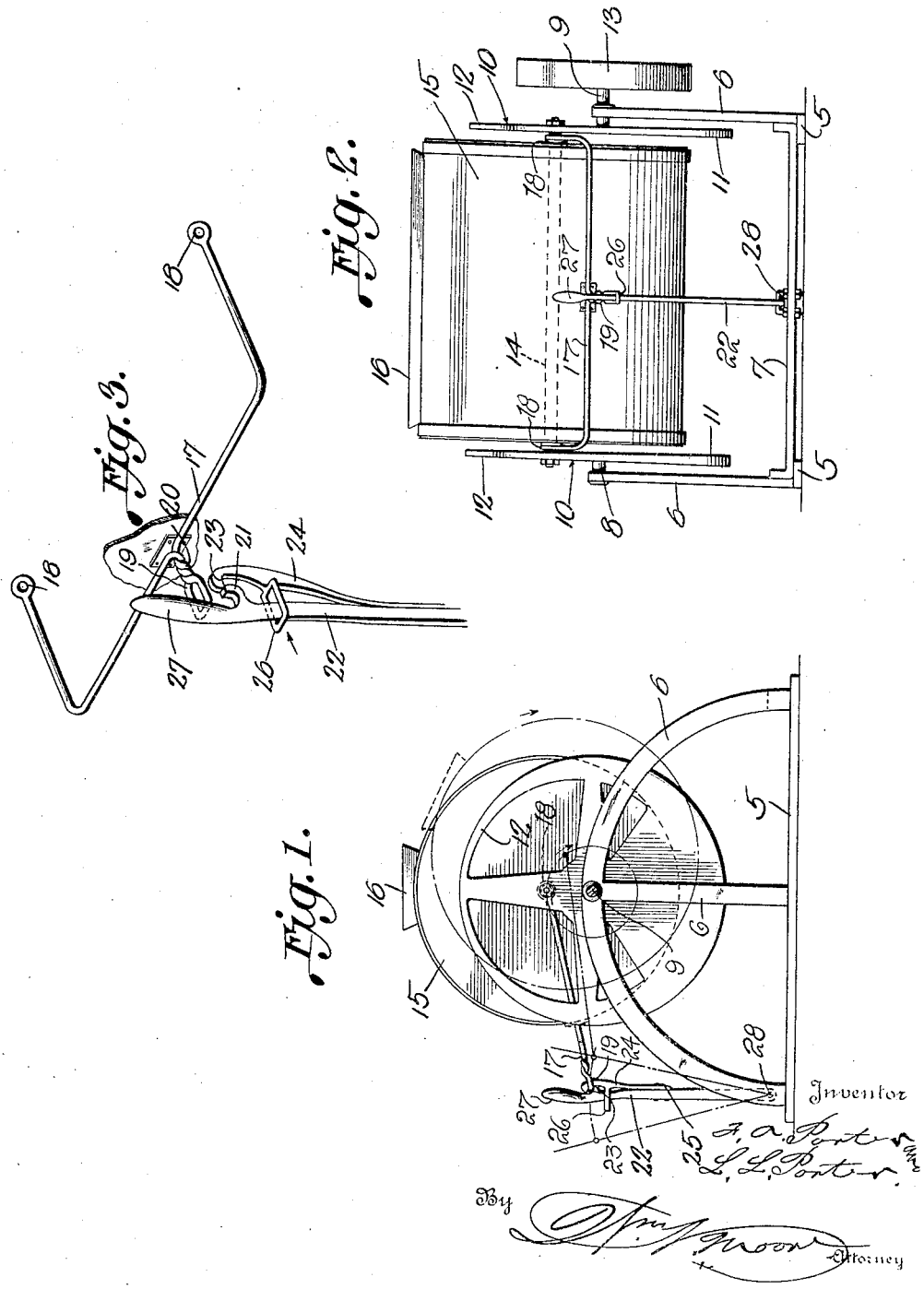

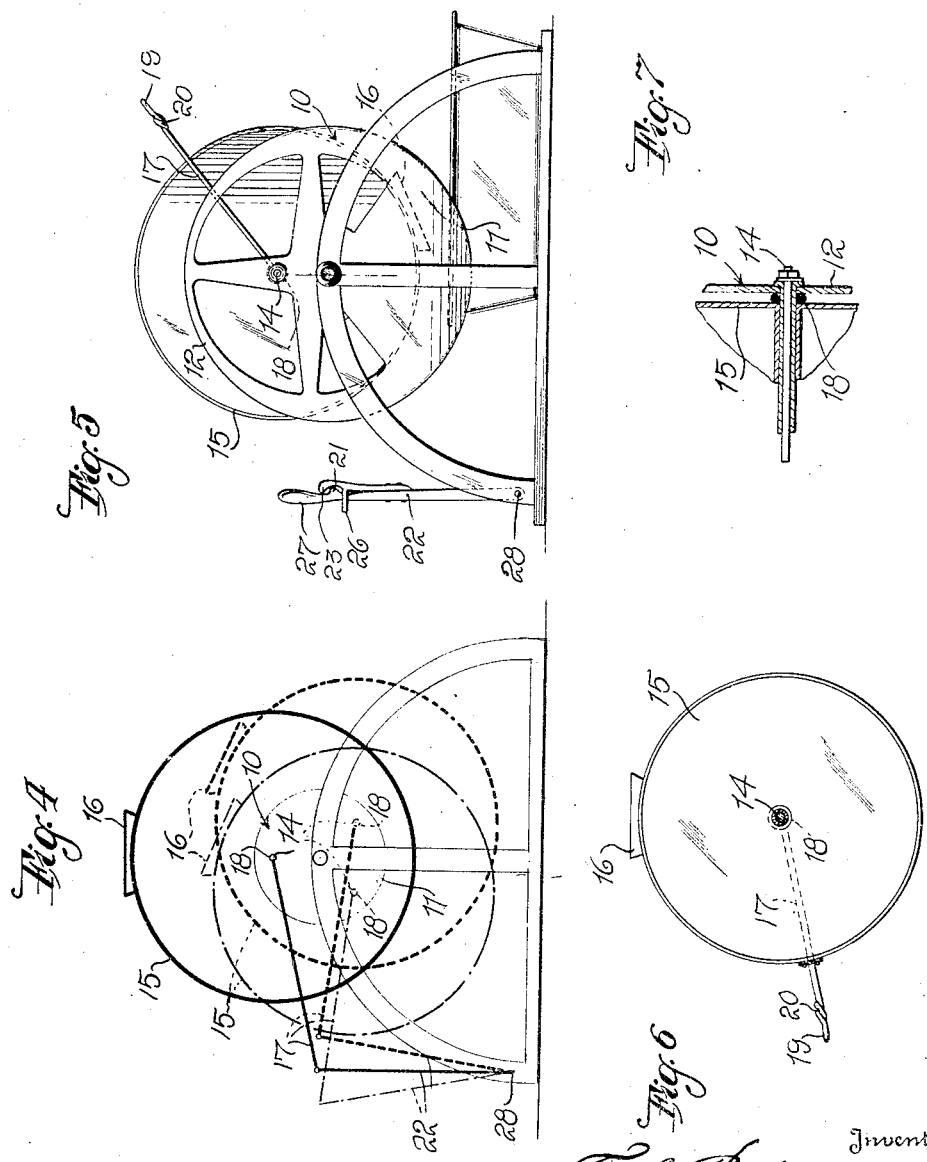

FRANCIS A. PORTER AND LYSANDER L. PORTER, OF ORDERVILLE, UTAH.

ROTARY CHURN.

1,355,000.  Specification of Letters Patent.  Patented Oct. 5, 1920.

Application filed May 25, 1920. Serial No. 384,186.

*To all whom it may concern:*

Be it known that we, FRANCIS A. PORTER and LYSANDER L. PORTER, citizens of the United States, and residing at Orderville, in the county of Kane and State of Utah, have invented certain new and useful Improvements in Rotary Churns, of which the following is a specification, reference being had therein to the accompanying drawing.

This invention relates to improvements in churns, one object of the invention being the provision of a rotating churn and a simple means by which the same may be rotated with the least possible exertion.

A further object of this invention is the provision of a novel weighted device for connection with the churn to act as a counter-balancing means whereby the churn is more readily rotated through a reciprocating motion imparted thereto by a hand lever and whereby any jerky action is eliminated.

In the accompanying drawings:

Figure 1 is a side elevation of the complete churn, dot and dash lines illustrating positions of the lever during the rotation of the churn.

Fig. 2 is a view in elevation taken from the operating side thereof.

Fig. 3 is a perspective view of the operating lever showing the novel means for connecting the same to the churn operating bail.

Fig. 4 is a side elevation of the churn showing the various positions the body occupies during its movements.

Fig. 5 is a side view of the churn with the body in dumping position.

Figs. 6 and 7 are detail views.

Referring to the drawings, the numeral 5 designates the base support, having the semi-circular standard 6 at opposite ends thereof with the lever supporting cross-bars 7. Journaled in the standards are the two short shafts 8 and 9, which in turn carry the peculiarly shaped oppositely disposed counter-balancing members 10, each one of which is substantially circular in plan and is provided with the weighted portion 11 and with the tapered cut-out portion 12. The fly or balance wheel 13 is attached to the shaft 9.

Journaled concentrically to each of the members 10 is a shaft 14 which extends through and carries the churn receptacle 15 which is of the cylinder type, with the filling and emptying portion 16. In order to impart the necessary movement to the churn so as to permit it to rotate with the axis 14 and yet be carried bodily thereby, the substantially U-shaped bail or connecting member 17 is provided, the terminals 18 thereof being connected about shaft 14 between the members 10 and the end of the churn receptacle 15, while the eye 19 formed by the twisted portion 20 thereof is adapted to fit in the hook 21 of the operating lever 22 and to be held seated therein by means of the hook terminal 23 of the retaining catch 24, which in turn is attached as at 25 to the lever 22. The member 24 is provided with the handle embracing yoke 26 which provides a finger means for releasing the hook 23 from the loop 19 so that the loop may be withdrawn from the loop 21 as desired. The lever 22 is provided with the gripping handle 27 and is pivoted as at 28 to the cross-bar 7.

From the foregoing description, the operation of the present churn is readily understood, but briefly stated, it is as follows: By causing the hand lever 22 to assume the two extreme dot and dash positions as shown in Fig. 1, a rotary motion is imparted through the shaft 14, the churn body 15 and also the counterbalancing members 11, which relieve the lever of considerable weight and therefore render it more easy to impart the desired rotary motion to the churn.

What is claimed as new is:

1. In a rotary churn, a supporting frame, two counter balancing members disposed in opposite and spaced relation for rotating upon the common center, a fixed churn receptacle having its axis connected and fixed eccentrically to and between said counter balancing members, manual means for imparting rotation to the counter balancing members, said latter means including a substantially U-shaped bail connected to the counter balancing levers at the junction of the churn receptacle, and a reciprocating hand lever having its very end connected to said bail.

2. In a rotary churn, a supporting frame, two counter balancing members disposed in opposite and spaced relation for rotating upon the common center, a fixed churn receptacle having its axis connected and fixed eccentrically to and between said counter balancing members, manual means for imparting rotation to the counter balancing members, said latter means including a substantially U-shaped bail connected to the counter balancing levers at the junction of the churn receptacle, a hand lever mounted for reciprocation, means carried thereby for connecting the same to the bail, and a spring catch for locking the bail in said connected position.

3. A churn including a support having two spaced standards, two circular counter balancing members, one to each support connected concentrically thereto for rotation, a fixed shaft connected eccentrically to both of said counter balancing members, and at opposite sides to the counter balanced portions thereof, a churn receptacle fixedly connected to said shaft and bodily movable with the counter balancing members, and manually or reciprocating means for imparting rotary movement to the counter balancing means and the churn receptacle.

In testimony whereof we affix our signatures.

FRANCIS A. PORTER.
LYSANDER L. PORTER.